(12) United States Patent
Asakura et al.

(10) Patent No.: US 8,813,903 B2
(45) Date of Patent: Aug. 26, 2014

(54) ELECTRIC POWER STEERING SYSTEM (71) Applicant: JTEKT Corporation, Osaka (JP)

(72) Inventors: Toshihiro Asakura, Chiryu (JP);
Takuya Nakayama, Munich (DE);
Tetsuya Kaneko, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/622,662

(22) Filed: Sep. 19, 2012

(65) Prior Publication Data

US 2013/0081899 A1  Apr. 4, 2013

(30) Foreign Application Priority Data

Sep. 29, 2011  (JP) .................................. 2011-214995

(51) Int. Cl.
*B62D 5/04* (2006.01)
(52) U.S. Cl.
CPC ............ *B62D 5/0448* (2013.01); *B62D 5/0442* (2013.01)
USPC .............................. 180/444; 180/443; 74/409
(58) Field of Classification Search
CPC ... B62D 5/0448; B62D 5/0445; B62D 5/0442
USPC ............ 74/409, 417, 440, 388 PS, 390, 395; 180/443, 444, 446
See application file for complete search history.

(56) References Cited

U.S. PATENT DOCUMENTS

| 6,823,962 B2 * | 11/2004 | Iwasa et al. ................... 180/444 |
| 2003/0121714 A1 | 7/2003 | Okada et al. |
| 2004/0154857 A1 | 8/2004 | Fukuda et al. |
| 2007/0107975 A1 * | 5/2007 | Onishi et al. .................. 180/444 |

FOREIGN PATENT DOCUMENTS

| EP | 1 225 117 A1 | 7/2002 |
| EP | 1 686 040 A1 | 8/2006 |
| EP | 2 218 626 A1 | 8/2010 |
| JP | A-2011-051387 | 3/2011 |

OTHER PUBLICATIONS

Extended European Search Report issued in European Patent Application No. 12185353.5 dated Jun. 23, 2014.

* cited by examiner

*Primary Examiner* — Tony Winner
*Assistant Examiner* — Jacob Knutson
(74) *Attorney, Agent, or Firm* — Oliff PLC (57) ABSTRACT

Assist force that assists an operation of a steering system of a vehicle is applied to a rack shaft by transmitting driving force of a motor to the rack shaft via a motor shaft and a ball screw nut. A step is formed on the outer periphery of the ball screw nut. An end portion of a third housing is arranged to face a bearing such that the distance that the ball screw nut is able to move relative to the motor shaft in axial direction and the relative movable length is longer than a predetermined length.

6 Claims, 8 Drawing Sheets

ELECTRIC POWER STEERING SYSTEM

INCORPORATION BY REFERENCE/RELATED APPLICATION

This application claims priority to Japanese Patent Application No. 2011-214995 filed on Sep. 29, 2011 the disclosure of which, including the specification, drawings and abstract, is incorporated herein by reference in its entirety.

BACKGROUND OF THE INVENTION

1. Field of the Invention

The invention relates to an electric power steering system that assists an operation of a steering system of a vehicle by applying assist force to a rack shaft of the vehicle.

2. Discussion of Background

Figure 9:
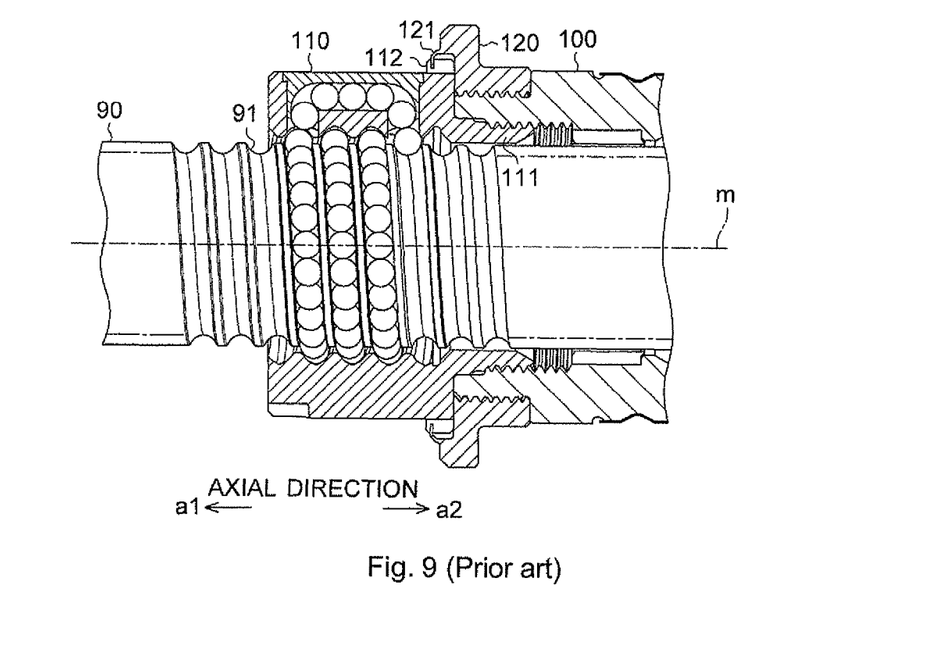
FIG. 9 is a sectional view that shows the sectional structure of an electric power steering system according to related art.

A conventional electric power steering system of this type is described in, for example, Japanese Patent Application Publication No. 2011-51387 (JP 2011-51387 A). FIG. 9 shows the structure of the electric power steering system described in JP 2011-51387 A. In a vehicle in which the electric power steering system is mounted, a rack shaft 90 in FIG. 9 makes a reciprocal motion in its axial direction (direction indicated by arrows a1, a2) in accordance with a driver's operation of a steering wheel and, as a result, the steered angle of steered wheels of the vehicle, that is, the travelling direction of the vehicle, is changed.

As shown in FIG. 9 as related art, the electric power steering system described in JP 2011-51387 A includes a cylindrical motor shaft 100 and a ball screw nut 110. The rack shaft 90 is passed through the motor shaft 100, and the motor shaft 100 is rotated about an axis m as a motor (not shown) is driven. The ball screw nut 110 is screwed to a thread groove 91 formed in the outer periphery of the rack shaft 90. An engaging portion 111 is provided at the right end portion of the ball screw nut 110. The engaging portion 111 is inserted into the motor shaft 100. An external thread portion formed on the outer periphery of the engaging portion 111 is screwed to an internal thread portion formed in the inner periphery of the motor shaft 100. With this configuration, the ball screw nut 110 is engaged with and coupled to the motor shaft 100. In the electric power steering system, the rotational motion of the motor shaft 100, which is generated as a the motor is driven, is converted to an axial linear motion of the rack shaft 90 via the ball screw nut 110. As a result, assist force is applied to the rack shaft 90.

In the thus structured electric power steering system, for example, if an excessive impact load acts on the rack shaft 90 when one of the steered wheels of the vehicle collides with a curb, the impact load is transmitted from the rack shaft 90 to the ball screw nut 110, and loosening may occur at a portion at which the engaging portion 111 of the ball screw nut 110 is fastened to the motor shaft 100. If it becomes impossible to transmit the driving force of the motor to the rack shaft 90 due to the loosening in the fastening structure, it may be not possible to apply assist force to the rack shaft 90.

Therefore, in the electric power steering system described in JP 2011-51387 A, a thin plate portion 121 of a flange member 120 that is fixedly fastened to an outer peripheral portion of the motor shaft 100 is folded and clinched to the flange portion 112 of the ball screw nut 110. In this way, the relative rotation of the ball screw nut 110 with respect to the motor shaft 100 is restricted. Thus, even if an impact load acts on the rack shaft 90, the connection between the motor shaft 100 and the ball screw nut 110 is maintained.

In order to manufacture the electric power steering system that has the above-described structure, a process of clinching the thin plate portion 121 of the flange member 120 to the flange portion 112 of the ball screw nut 110 is required. This leads to an increase in man-hours required to manufacture the electric power steering system, and consequently causes an increase in production cost.

SUMMARY OF THE INVENTION

The invention provides an electric power steering system in which the connection between a motor shaft and a ball screw nut is maintained even if an impact load acts on a rack shaft, which requires less manufacturing man-hours, and which is more easily assembled.

According to a feature of an example of the invention, in an electric power steering system that applies assist force that assists an operation of a steering system of a vehicle to a rack shaft, there is provided a restricting member that restricts a distance that a motion conversion mechanism is able to move relative to a motor shaft in such a direction that engagement of an engaging portion is cancelled, to a predetermined distance, and a length of the engaging portion is set longer than the predetermined distance. This structure makes it possible to maintain connection between the motor shaft and a ball screw nut even if an impact load acts on the rack shaft. In addition, this structure makes it possible to reduce man-hours required to manufacture the electric power steering system, and to facilitate assembly of the electric power steering system.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An electric power steering system according to a first embodiment of the invention will be described with reference to FIG. 1 to FIG. 4.

Figure 1:
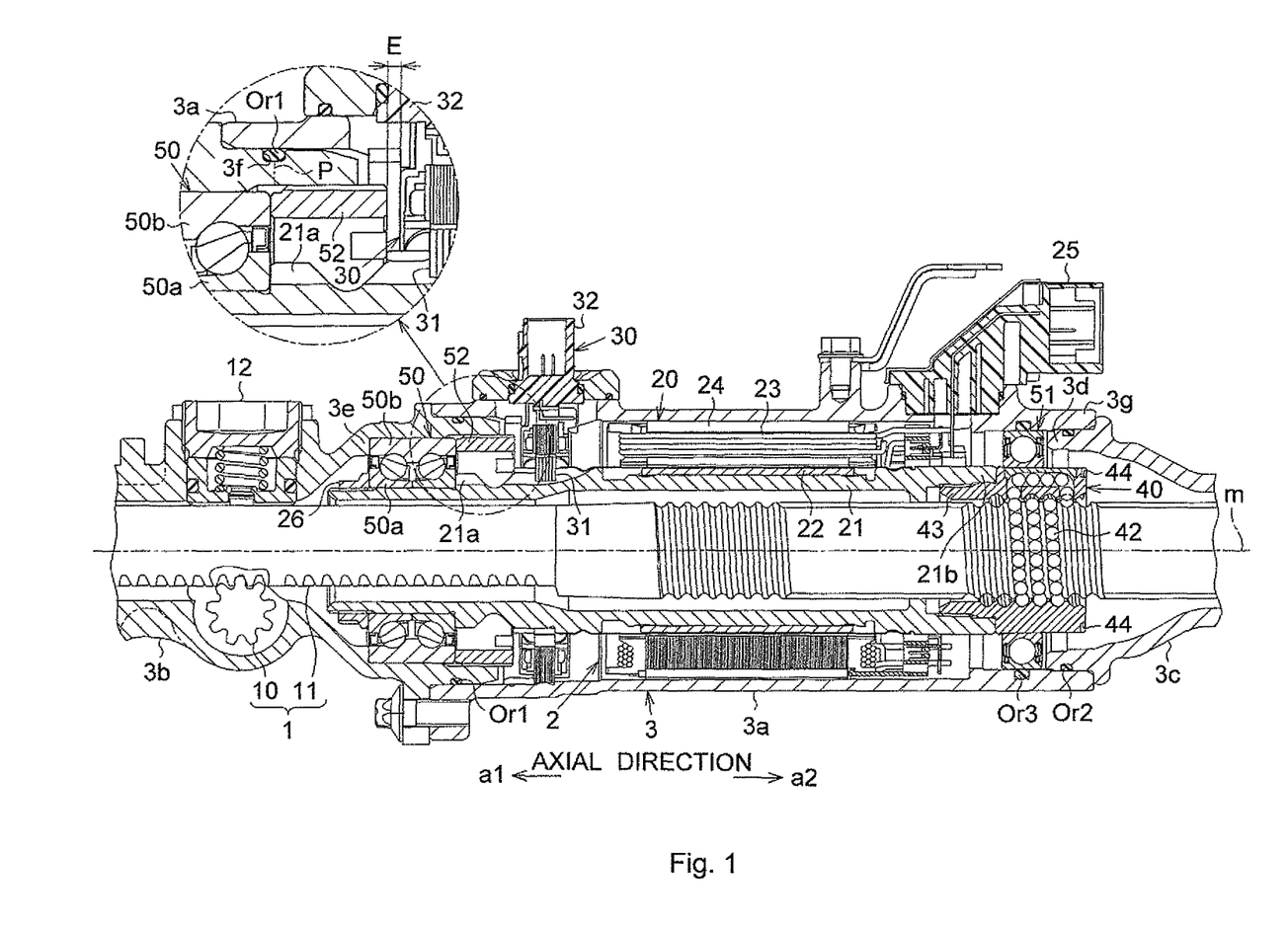
FIG. 1 is a sectional view that shows the sectional structure of an electric power steering system according to a first embodiment of the invention.

As shown in FIG. 1, the electric power steering system is formed of a steering mechanism 1 and an assist mechanism 2. The steering mechanism 1 changes the steered angle of steered wheels of a vehicle in response to a driver's operation of a steering wheel. The assist mechanism 2 assists the driver in performing a steering operation. In the electric power steering system, the steering mechanism 1 and the assist mechanism 2 are covered with a housing 3 to be protected from the external environment.

The housing 3 is structured such that a second housing 3b is connected via an O ring Or1 to one end portion of a first housing 3a that covers the radially outer side of the assist mechanism 2 and a third housing 3c is connected via an O ring Or2 to the other end portion of the first housing 3a. In this way, by forming the housing 3 as a splittable body formed of three portions, flexibility in design and assembly of the housing 3 and usability are improved.

In addition, the steering mechanism 1 includes a pinion shaft 10 and a rack shaft 11. The pinion shaft 10 is accommodated inside the second housing 3b, and rotates in accordance with a steering operation of the steering wheel. The rack shaft 11 is passed through the housing 3, and is in mesh with the pinion shaft 10. The rack shaft 11 is supported by a rack guide 12, which is provided on the second housing 3b, so as to be able to make a reciprocal motion in an axial direction (direction indicated by arrows a1 and a2). In addition, the steered wheels (not shown) of the vehicle are coupled to respective ends of the rack shaft 11 via tie rods (not shown). In the steering mechanism 1, the rack shaft 11 makes a reciprocal motion in the axial direction in accordance with the rotation of the pinion shaft 10. As a result, the steered angle of the steered wheels of the vehicle is changed.

The assist mechanism 2 includes a motor 20, a rotation sensor 30 and a ball screw nut 40. The motor 20 serves as a drive source. The rotation sensor 30 detects the rotation angle of the motor 20. The ball screw nut 40 serves as a motion conversion mechanism that converts the rotational motion of the motor 20 into an axial linear motion of the rack shaft 11.

The motor 20 is formed of a cylindrical motor shaft 21 and a stator 24. A magnet 22 is fixed to the outer periphery of the motor shaft 21. The stator 24 has energizable coils 23, and surrounds the outer periphery of the motor shaft 21. The stator 24 is fixed to the inner periphery of the first housing 3a. In addition, an end portion of the motor shaft 21 in the direction of the arrow a1 is rotatably supported by a bearing 50 that serves as a motor shaft bearing. The rack shaft 11 is passed through the motor shaft 21. As a result, the motor shaft 21 and the rack shaft 11 are arranged on the same axis m. In the motor 20, as an electromagnetic force that corresponds to electric power supplied to the stator 24 acts on the magnet 22, the motor shaft 21 rotates about the axis m.

Power is supplied to the motor 20 via a power supply connector 25 provided at the right end portion of the first housing 3a. An inner ring 50a of the bearing 50 is held between a step 21a and a nut 26. The step 21a is formed on the outer periphery of the motor shaft 21. The nut 26 is screwed to the outer periphery of the end portion of the motor shaft 21. The inner ring 50a is fixed to the motor shaft 21 by fastening the nut 26. In addition, an outer ring 50b of the bearing 50 is held between a step 3e and a center nut 52. The step 3e is formed on the inner periphery of the second housing 3b. The center nut 52 is screwed to the inner periphery of the second housing 3b. The outer ring 50b is fixed to the housing 3 by fastening the center nut 52. The position of the bearing 50 is fixed by a fastening structure achieved by the nut 26 and the center nut 52. In the present embodiment, the center nut 52 serves as a bearing restricting member that restricts the movement of the bearing 50 in the direction indicated by the arrow a2.

The rotation sensor 30 is fixed to the first housing 3a so as to be located between the center nut 52 and the motor 20. As shown in an enlarged view in FIG. 1, a clearance having a width E is formed between the rotation sensor 30 and the center nut 52. The rotation sensor 30 has a sensing portion 31 that is arranged so as to face the motor shaft 21, and detects the rotation angle of the motor shaft 21 using the sensing portion 31. The rotation sensor 30 has a connector portion 32 that is provided so as to protrude from the upper portion of the outer periphery of the first housing 3a. Via the connector portion 32, electric power is supplied to the rotation sensor 30, and an electrical signal that corresponds to the rotation angle detected with the use of the sensing portion 31 is output. The signal output from the rotation sensor 30 is input into a control unit (not shown) that executes integrated drive control over the electric power steering system. The control unit supplies power to the motor 20 on the basis of the rotation angle of the motor shaft 21, which is detected by the rotation sensor 30, and executes drive control over the motor 20.

Figure 2:
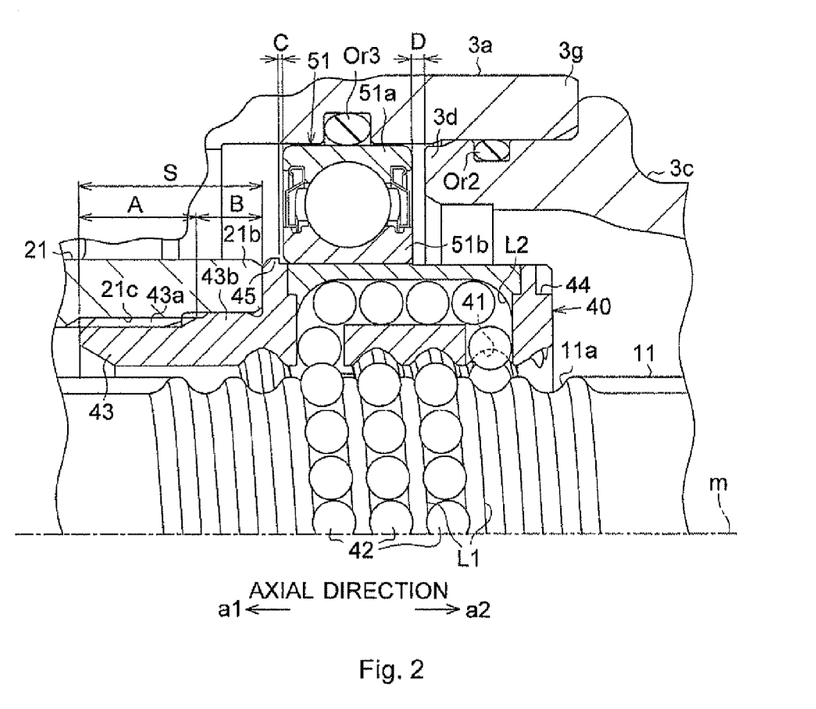
FIG. 2 is a sectional view that shows the enlarged sectional structure of a ball screw nut and its surrounding portions in the electric power steering system according to the first embodiment.

As shown in FIG. 2 that shows the enlarged structure of the ball screw nut 40 and its surrounding portions, the ball screw nut 40 is fitted to a portion of the outer periphery of the rack shaft 11, at which a thread groove 11a is formed. A thread groove 41 that corresponds to the thread groove 11a of the rack shaft 11 is formed in the inner periphery of the ball screw nut 40, and a plurality of balls 42 is accommodated in a spiral rolling passage L1 formed by the thread grooves 11a, 41. In addition, a circulating passage L2 is formed in the ball screw nut 40. The circulating passage L2 connects two portions in the thread groove 41 to each other. With this configuration, as the ball screw nut 40 rotates relative to the rack shaft 11, the balls 42 circulate while rolling through the spiral rolling passage L1 and the circulating passage L2. In the ball screw nut 40, axial force is applied to the rack shaft 11 through the rolling of the balls 42.

An engaging portion (inserting portion) 43 is formed in the ball screw nut 40. The engaging portion 43 is inserted into the motor shaft 21 from an open end 21b in the direction indicated by the arrow a2. An external thread portion 43a and a spigot engagement portion 43b are formed in the engaging portion 43. The external thread portion 43a is screwed to an internal threaded hole 21c that is formed on the inner periphery of the motor shaft 21 at a portion which is offset from the open end 21b in the direction indicated by the arrow a1. The spigot engagement portion 43b is fitted to the inner periphery of the open end 21b of the motor shaft 21. The ball screw nut 40 is engaged with and coupled to the motor shaft 21 by fastening the external thread portion 43a of the engaging portion 43 to the internal threaded hole 21c of the motor shaft 21. The axial length of the external thread portion 43a is set to "A", and the axial length of the spigot engagement portion 43b is set to "B". That is, the length S (more specifically, the axial length) of the engaging portion 43 is set to "A+B".

In the process of manufacturing the electric power steering system described above, when the ball screw nut 40 is fitted to the motor shaft 21, first, the motor shaft 21 is fixed to a jig, or the like, and then the ball screw nut 40 is rotated by a nut runner to temporarily tighten the ball screw nut 40 to the motor shaft 21. After that, fastening axial force is applied to the ball screw nut 40 with a tool to finally tighten the ball screw nut 40 to the motor shaft 21. In this way, the ball screw nut 40 is fitted to the motor shaft 21. However, if the ball screw nut 40 is fitted to the motor shaft 21 in this way, operational cost for the nut runner occurs. This is one of factors that cause an increase in the manufacturing cost of the electric power steering system.

Figure 3A:
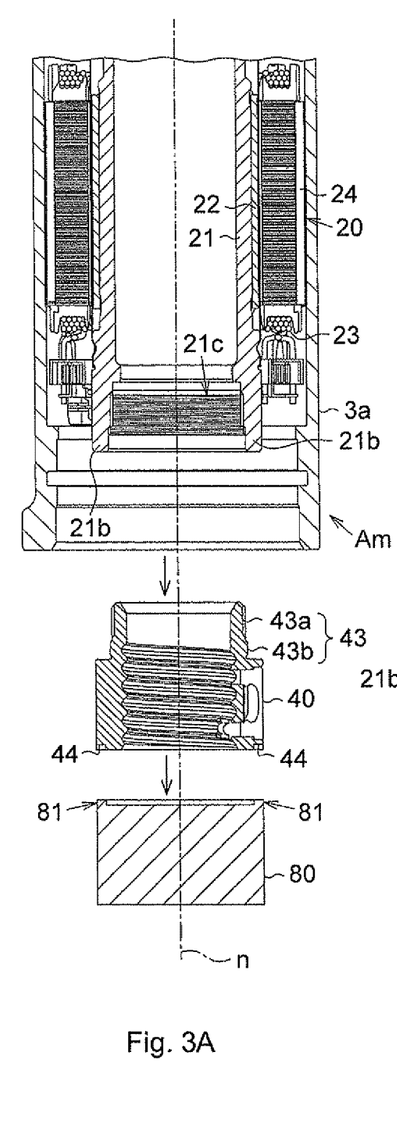
FIG. 3A and FIG. 3B are sectional views that show a method of fitting the ball screw nut to a motor shaft in the electric power steering system according to the first embodiment.

Therefore, in the present embodiment, a method shown in FIG. 3A and FIG. 3B is employed as the method of fitting the ball screw nut 40 to the motor shaft 21. As shown in FIG. 3A, in the present embodiment, a cutout 44 is formed in advance in an end face that is axially on the opposite side of the ball screw nut 40 from an end face at which the engaging portion 43 of the ball screw nut 40 is formed. When the ball screw nut 40 is fitted to the motor shaft 21, first, the ball screw nut 40 is placed on the upper face of a fixing jig 80 with the engaging portion 43 oriented upward. At this time, a lug portion 81 formed on the upper face of the fixing jig 80 is inserted in the cutout 44 formed in the ball screw nut 40. Thus, the ball screw nut 40 is fixed with its rotation about an axis n restricted.

Figure 3B:
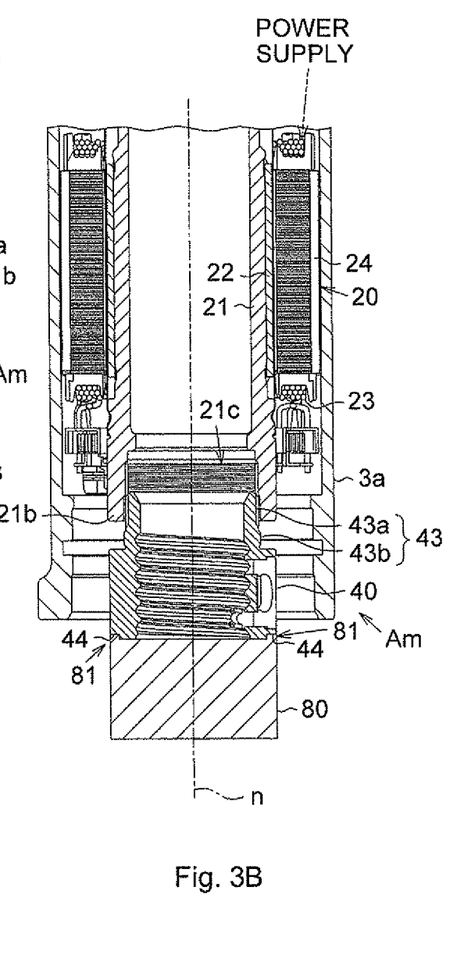

After that, a motor assembly Am that is a unit of the first housing 3a and the motor 20 is brought closer to the ball screw nut 40 from above. Then, as shown in FIG. 3B, the external thread portion 43a of the ball screw nut 40 is brought into contact with the end portion of the internal threaded hole 21c of the motor shaft 21. Then, in this state, the motor shaft 21 is rotated about the axis n by supplying power to the motor 20. In this way, the external thread portion 43a of the ball screw nut 40 is fastened to the internal threaded hole 21c of the motor shaft 21. At this time, final fastening axial force for fastening the external thread portion 43a of the engaging portion 43 to the internal threaded hole 21c of the motor shaft 21 is generated by utilizing inertial force due to the rotation of the motor shaft 21. At this time, the spigot engagement portion 43b of the engaging portion 43 is fitted to the inner periphery of the open end 21b of the motor shaft 21. In this way, the central axis of the motor shaft 21 coincides with the central axis of the ball screw nut 40/

With the above fitting method, it is possible to fit the ball screw nut 40 to the motor shaft 21 without using a nut runner. Therefore, the operational cost for a nut runner is no longer necessary. Thus, it is possible to reduce the manufacturing cost of the electric power steering system.

As shown in FIG. 2, a bearing 51 is arranged on the outer periphery of the ball screw nut 40. The bearing 51 is assembled to the inner periphery of the first housing 3a via an O ring Or3. The bearing 51 is arranged with a clearance having a width C left between the bearing 51 and a step 45 that is formed on the outer periphery of the ball screw nut 40. In addition, an end portion 3d of the third housing 3c is arranged with a clearance having a width D left between the end portion 3d and the bearing 51 in the direction indicated by the arrow a2. If the clearance is formed between the step 45 of the ball screw nut 40 and the bearing 51 and the clearance is formed between the bearing 51 and the third housing 3c as described above, fitting deviations of components of the electric power steering system are absorbed by the clearances. This facilitates assembly of the electric power steering system. In addition, the inner diameter of the end portion 3d of the third housing 3c is substantially the same as the inner diameter of an outer ring 51a of the bearing 51. With this configuration, when the bearing 51 moves to a position at which the bearing 51 contacts the end portion 3d of the third housing 3c, the end portion 3d of the third housing 3c contacts only the outer ring 51a of the bearing 51.

Furthermore, in the present embodiment, the length S of the engaging portion 43 of the ball screw nut 40 is set longer than the length "C+D" that is the sum of the width C of the clearance between the step 45 of the ball screw nut 40 and the bearing 51 and the width D of the clearance between the third housing 3c and the bearing 51. In addition, the width E of the clearance between the rotation sensor 30 and the center nut 52, shown in FIG. 1, is also set longer than "C+D".

Figure 4:
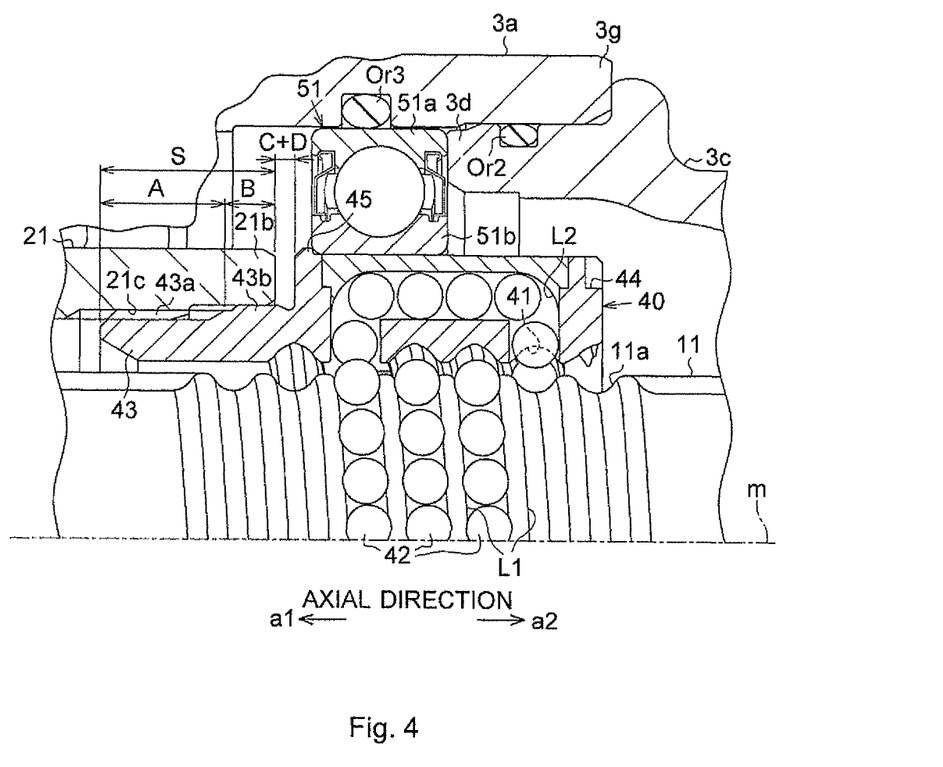
FIG. 4 is a sectional view that shows an example of an operation of the electric power steering system according to the first embodiment.

Next, the operation of the electric power steering system according to the present embodiment will be described with reference to FIG. 1, FIG. 2 and FIG. 4. The following description will be provided on the assumption that when one of the steered wheels of the vehicle collides with, for example, a curb, an excessive impact load acts on the rack shaft 11 shown in FIG. 1 and therefore loosening occurs at the portion at which the engaging portion 43 of the ball screw nut 40 is fastened to the motor shaft 21. If the impact load is larger than expected, the ball screw nut 40 is able to rotate relative to the motor shaft 21, so the ball screw nut 40 may move relative to the motor shaft 21 in the direction indicated by the arrow a2, that is, in such a direction that engagement of the engaging portion 43 is cancelled. In this case, as shown in FIG. 2, when the ball screw nut 40 moves in the direction indicated by the arrow a2, the bearing 51 is pushed by the step 45 of the ball screw nut 40 in the direction indicated by the arrow a2. Then, as shown in FIG. 4, when the bearing 51 contacts the end portion 3d of the third housing 3c, further movement of the bearing 51 is restricted. Therefore, the distance that the ball screw nut 40 is able to move relative to the motor shaft 21 is the length "C+D" that is the sum of the width C of the clearance between the step 45 of the ball screw nut 40 and the bearing 51 and the width D of the clearance between the third housing 3c and the bearing 51, shown in FIG. 2. In the present embodiment, because the length S of the engaging portion 43 of the ball screw nut 40 is longer than "C+D", the engaging portion 43 of the ball screw nut 40 does not fall off the inside of the motor shaft 21 as shown in the drawing. With this configuration, even if an impact load acts on the rack shaft 11, it is possible to maintain connection between the ball screw nut 40 and the motor shaft 21, so it is possible to apply assist force from the motor shaft 21 to the rack shaft 11. In addition, it is not necessary to provide a clinching structure between the ball screw nut 40 and the motor shaft 21, so it is possible to reduce man-hours required to manufacture the electric power steering system.

If it is possible to maintain the state where the engaging portion 43 of the ball screw nut 40 is inserted inside the motor shaft 21, when the motor shaft 21 repeatedly rotates about the axis m in the forward and reverse directions as the motor 20 is driven, the engaging portion 43 of the ball screw nut 40 is spontaneously fastened to the motor shaft 21 by the rotational force of the motor shaft 21. Therefore, it is possible to further appropriately maintain the connection between the ball screw nut 40 and the motor shaft 21. In addition, in the present embodiment, when the ball screw nut 40 moves in the direction indicated by the arrow a2, the end portion 3d of the third housing 3c contacts only the outer ring 51a of the bearing 51. Therefore, the motion of the inner ring 51b of the bearing 51 is not hindered, so the ball screw nut 40 is rotatable as usual. Thus, the axial motion of the rack shaft 11 is appropriately maintained.

When one of the steered wheels of the vehicle collides with a curb, an impact load in the direction indicated by the arrow a2 may act on the rack shaft 11 shown in FIG. 1. In this case, if the impact load that acts on the rack shaft 11 is transmitted in the order of the ball screw nut 40, the motor shaft 21, the bearing 50 and the center nut 52, as shown in the enlarged view, a crack may develop from a groove 3f of the second housing 3b, in which the O ring Or1 is fitted, toward the inner periphery of the housing 3b and the housing 3b may occur at a portion indicated by long dashed double-short dashed line P in the drawing. In this case, the center nut 52 is movable in the direction indicated by the arrow a2 relative to the housing 3, so the center nut 52 may contact the rotation sensor 30 and the rotation sensor 30 may be damaged.

In order to avoid this problem, in the present embodiment, the width E of the clearance between the rotation sensor 30 and the center nut 52 is set longer than the length "C+D" that is the sum of the width C of the clearance between the step 45 of the ball screw nut 40 and the bearing 51 and the width D of the clearance between the third housing 3c and the bearing 51, as described above. With this configuration, when the rack shaft 11 or the ball screw nut 40 moves in the direction indicated by the arrow a2 relative to the housing 3, the bearing 51 contacts the end portion 3d of the third housing 3c. Accordingly, the movement of the ball screw nut 40, the motor shaft 21, the bearing 50 and the center nut 52 in the direction indicated by the arrow a2 is restricted. Thus, it is possible to avoid the situation where the center nut 52 contacts the rotation sensor 30. As a result, it is possible to prevent damage to the rotation sensor 30.

As in the case of an electric power steering system shown in FIG. 9 as related art, when a motor shaft and a ball screw nut are fixed to each other through the clinching structure provided by a flange member, it is first necessary to remove a bearing arranged radially outward of the ball screw nut in order to remove the ball screw nut from the motor shaft. However, because there is no space, into which a tool is inserted, around the bearing, the bearing needs to be broken. After the bearing is broken, the flange member is removed, and finally the motor shaft and the ball screw nut are rotated relative to each other. In this way, the ball screw nut is removed from the motor shaft. As described above, in the conventional electric power steering system, because the bearing needs to be broken at the time of disassembling the electric power steering system, a complicated work is required. In addition, if such disassembling work is performed, it is not possible to reuse the bearing and the flange member. In this regard, there is still room for improvement.

In this regard, in the present embodiment, if the third housing 3c is removed from the first housing 3a and then the motor shaft 21 and the ball screw nut 40 are rotated relative to each other to remove the ball screw nut 40 from the motor shaft 21, it is possible to remove the ball screw nut 40 from a right end portion 3g of the first housing 3a. At this time, the bearing 51 is removed from the right end portion 3g of the first housing 3a without being broken. Therefore, all the components are reusable, and it is possible to easily perform a disassembling work.

As described above, with the electric power steering system according to the present embodiment, the following advantageous effects are obtained.

The end portion 3d of the third housing 3c is arranged to face the bearing 51 such that the distance that the ball screw nut 40 is able to move relative to the motor shaft 21 in the axial direction is restricted to "C+D". In addition, the length S of the engaging portion 43 of the ball screw nut 40 is set longer than the length "C+D" that is the sum of the width C of the clearance between the step 45 of the ball screw nut 40 and the bearing 51 and the width D of the clearance between the third housing 3e and the bearing 51. With this configuration, even if an impact load acts on the rack shaft 11, it is possible to maintain connection between the ball screw nut 40 and the motor shaft 21. In addition, because a clinching structure between the ball screw nut 40 and the motor shaft 21 is no longer necessary, it is possible to reduce man-hours required to manufacture the electric power steering system. Furthermore, because fitting deviations of components of the electric power steering system are absorbed by the clearance between the step 45 of the ball screw nut 40 and the bearing 51 and the clearance between the third housing 3c and the bearing 51, assembly of the electric power steering system is facilitated.

When the bearing 51 moves in the axial direction, the end portion 3d of the third housing 3c is brought into contact with only the outer ring 51a of the bearing 51. Thus, the axial motion of the rack shaft 11 is appropriately maintained. As a result, it is possible to further appropriately maintain drivability.

The step 45 is formed on the outer periphery of the ball screw nut 40. The step 45 contacts the bearing 51 to pushes the bearing 51 in the axial direction when the ball screw nut 40 moves in the axial direction relative to the motor shaft 21. Thus, it is possible to move the ball screw nut 40 and the bearing 51 together with an extremely simple structure in which the step 45 is formed on the outer periphery of the ball screw nut 40. As a result, it is possible to easily achieve the structure for restricting the movement of the ball screw nut 40.

The third housing 3c is utilized as a restricting member that restricts the movement of the ball screw nut 40. Therefore, it is not necessary to provide a restricting member. As a result, it is possible to reduce cost.

The width E of the clearance formed between the center nut 52 and the rotation sensor 30 is set longer than the length "C+D" that is the sum of the width C of the clearance between the step 45 of the ball screw nut 40 and the bearing 51 and the width D of the clearance between the third housing 3c and the bearing 51. With this configuration, even if an excessive impact load acts on the rack shaft 11, it is possible to avoid the situation where the center nut 52 contacts the rotation sensor 30. As a result, it is possible to prevent damage to the rotation sensor 30.

Note that the above-described embodiment may be modified, as needed, into the following alternative embodiments.

The length S of the engaging portion 43 of the ball screw nut 40, the length A of the external thread portion 43a and the length B of the spigot engagement portion 43b may be changed as needed. In addition, the widths C to E of the respective clearances may also be changed as needed. In short, the above-mentioned lengths and widths may be set to any values as long as the length S of the engaging portion 43 of the ball screw nut 40 is longer than "C+D" and the width E of the clearance formed between the center nut 52 and the rotation sensor 30 is longer than "C+D".

Figure 5A:
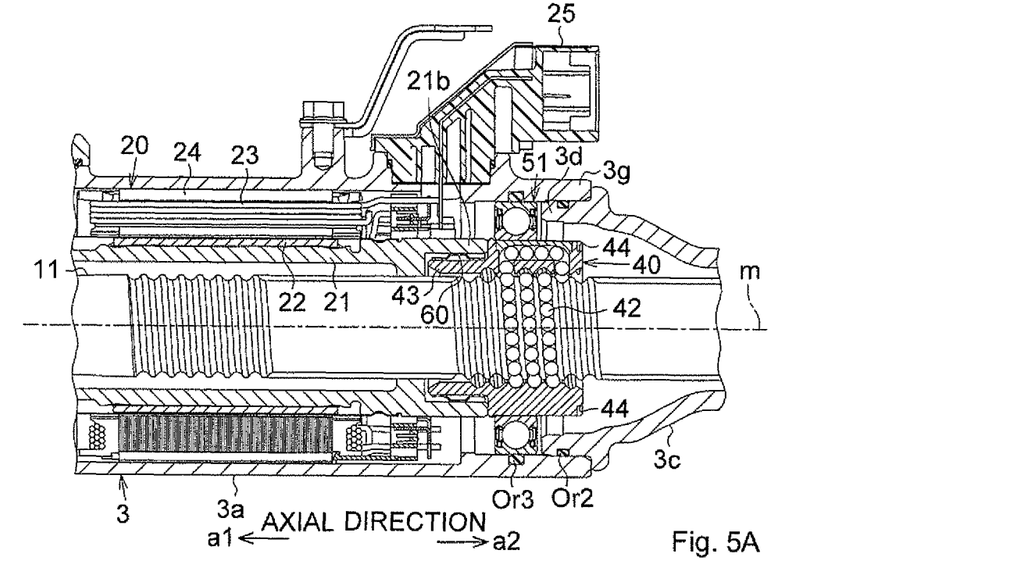
FIG. 5A is a sectional view that shows the sectional structure of an electric power steering system according to a second embodiment of the invention.
Figure 5B:
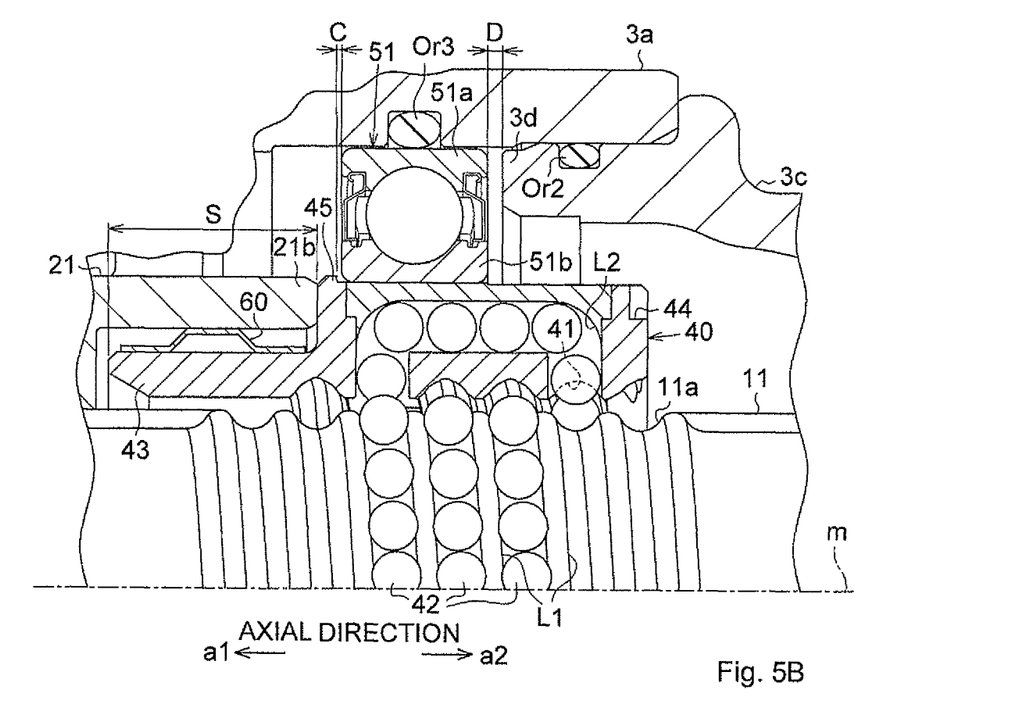
FIG. 5B is an enlarged view the ball screw nut and its surrounding portions shown in FIG. 5A.

In the above-described embodiment, the engaging portion 43 of the ball screw nut 40 is fastened to the motor shaft 21 through thread fastening. Alternatively, as shown in FIG. 5A, a leaf spring (tolerance ring) 60 may be interposed between the engaging portion 43 of the ball screw nut 40 and the inner periphery of the open end 21b of the motor shaft 21 and the ball screw nut 40 and the motor shaft 21 may be engaged with and coupled to each other by the tension of the leaf spring 60 (second embodiment). In this case, as shown in FIG. 5B that shows the enlarged structure of the ball screw nut 40 and its surrounding portions, the length of the engaging portion 43 is the length S in the drawing.

Figure 6A:
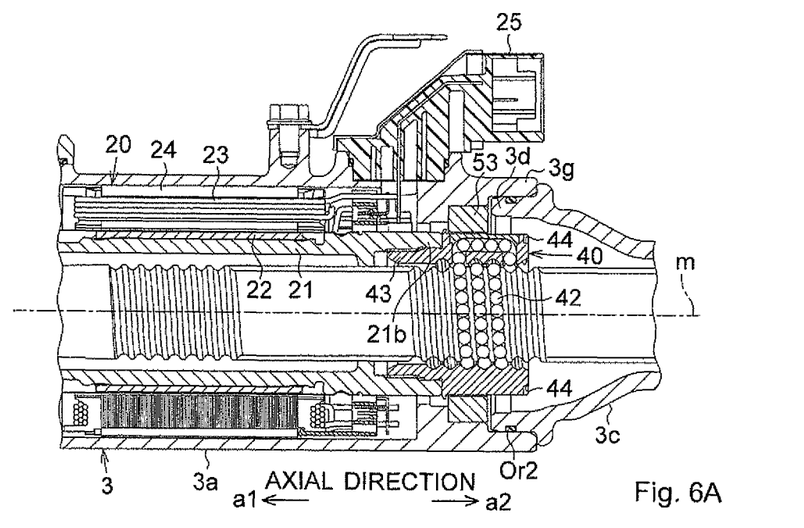
FIG. 6A is a sectional view that shows the sectional structure of an electric power steering system according to a third embodiment of the invention.
Figure 6B:
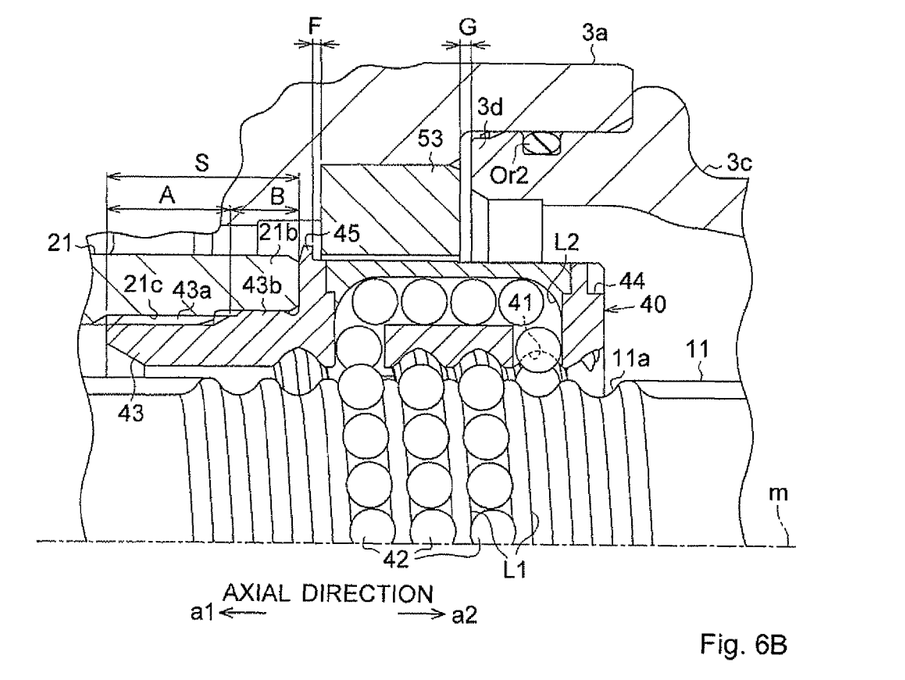
FIG. 6B is an enlarged view of the ball screw nut and its surrounding portions shown in FIG. 6A.

In the above-described embodiment, the bearing 51 is arranged on the outer periphery of the ball screw nut 40. Alternatively, as shown in FIG. 6A, a bush 53 may be interposed between the ball screw nut 40 and the first housing 3a (third embodiment). When the bush 53 is used, if the bush 53 contacts the end portion 3d of the third housing 3c as the ball screw nut 40 moves in the direction indicated by the arrow a2, the bush 53 and the third housing 3c are brought into plane contact with each other. Therefore, friction force is generated between the bush 53 and the third housing 3c, and the rotation of the ball screw nut 40 and the axial movement of the rack shaft 11 may be hindered. To avoid this problem, for example, sticking a low-friction sheet (low μ sheet), or the like, onto a surface of the third housing 3c, which the bush 53 of the third housing 3c contacts, is effective. In this way, it is possible to reduce friction force generated between the bush 53 and the third housing 3c. As a result, the movement of the ball screw nut 40 and the rack shaft 11 is less likely to be hindered. In this case, as shown in FIG. 6B that shows the enlarged structure of the ball screw nut 40 and its surrounding portions, when the length S of the engaging portion 43 of the ball screw nut 40 is set longer than "F+G" in the drawing, it is possible to maintain connection between the ball screw nut 40 and the motor shaft 21. Note that "F" denotes the width of the clearance between the step 45 of the ball screw nut 40 and the bush 53. In addition, "G" denotes the width of the clearance between the third housing 3c and the bush 53.

Figure 7A:
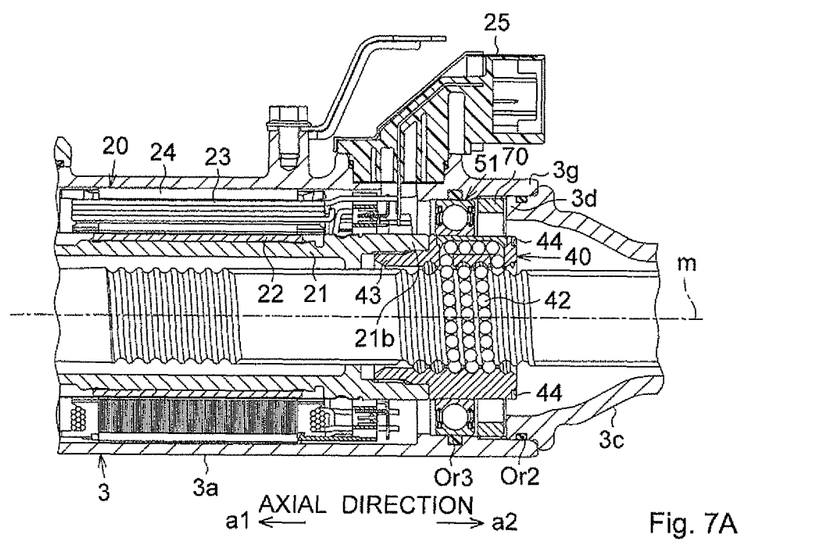
FIG. 7A is a sectional view that shows the sectional structure of an electric power steering system according to a fourth embodiment of the invention.
Figure 7B:
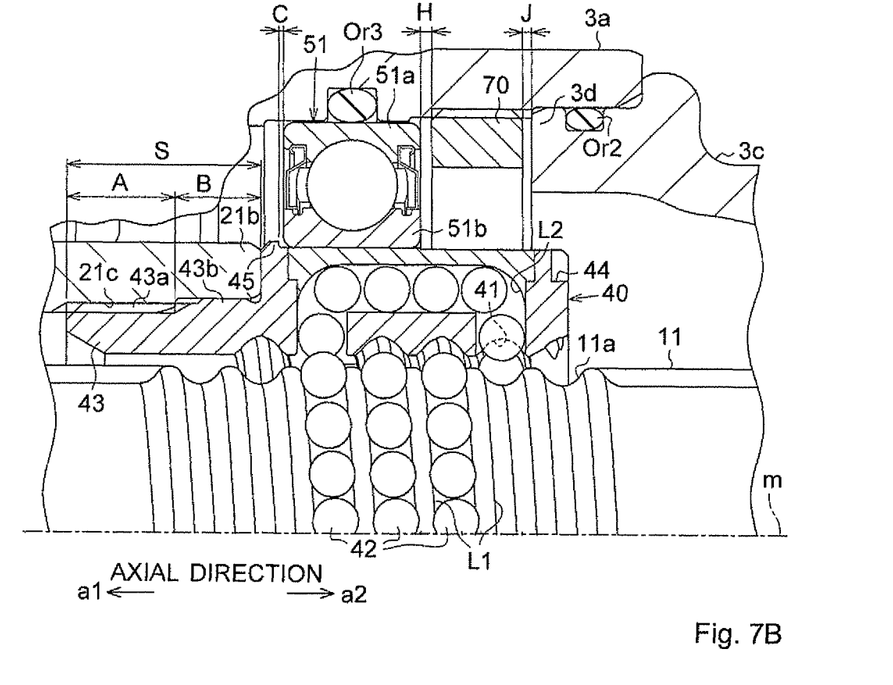
FIG. 7B is an enlarged view of the ball screw nut and its surrounding portions shown in FIG. 7A.

In the above-described embodiment, the third housing 3c is utilized as a member that restricts the movement of the bearing 51 in the direction indicated by the arrow a2. Alternatively, as shown in FIG. 7A, a ring-shaped restricting member 70 may be fastened to an inner peripheral portion of the first housing 3a, which is located between the bearing 51 and the third housing 3c, and the movement of the bearing 51 in the direction indicated by the arrow a2 may be restricted by the restricting member 70 (fourth embodiment). In this case, as shown in FIG. 7B that shows the enlarged structure of the ball screw nut 40 and its surrounding portions, setting the inner diameter of the restricting member 70 to a value substantially equal to the inner diameter of the outer ring 51a of the bearing 51 is effective. In this way, the restricting member 70 is able to contact only the outer ring 51a of the bearing 51. Therefore, it is possible to appropriately maintain the axial movement of the rack shaft 11 as in the case of the above-described embodiment. In addition, in this case, when the width of the clearance between the restricting member 70 and the bearing 51 is "H", if the length S of the engaging portion 43 of the ball screw nut 40 is longer than "C+H" in the drawing, it is possible to maintain connection between the ball screw nut 40 and the motor shaft 21. Furthermore, when the width of the clearance between the restricting member 70 and the third housing 3c is "J", if the length S of the engaging portion 43 of the ball screw nut 40 is set longer than "C+H+J" in the drawing, it is possible to maintain connection between the ball screw nut 40 and the motor shaft 21 even if loosening of the restricting member 70 occurs.

In the above-described embodiment, the step 45 is formed on the outer periphery of the ball screw nut 40 in order to move the ball screw nut 40 and the bearing 51 together with each other. However, any structure may be employed as long as the structure allows the ball screw nut 40 and the bearing 51 to move together with each other.

The end portion 3d of the third housing 3c may be able to contact the inner ring 51b of the bearing 51. In this case, sticking a low-friction sheet, or the like, onto an end face of the end portion 3d of the third housing 3c, which the bearing 51 contacts, is effective. In this way, it is possible to reduce friction force generated between the bearing 51 and the end portion 3d of the third housing 3c when the bearing 51 contacts the end portion 3d. As a result, the movement of the ball screw nut 40 and the rack shaft 11 is less likely to be hindered.

Figure 8:
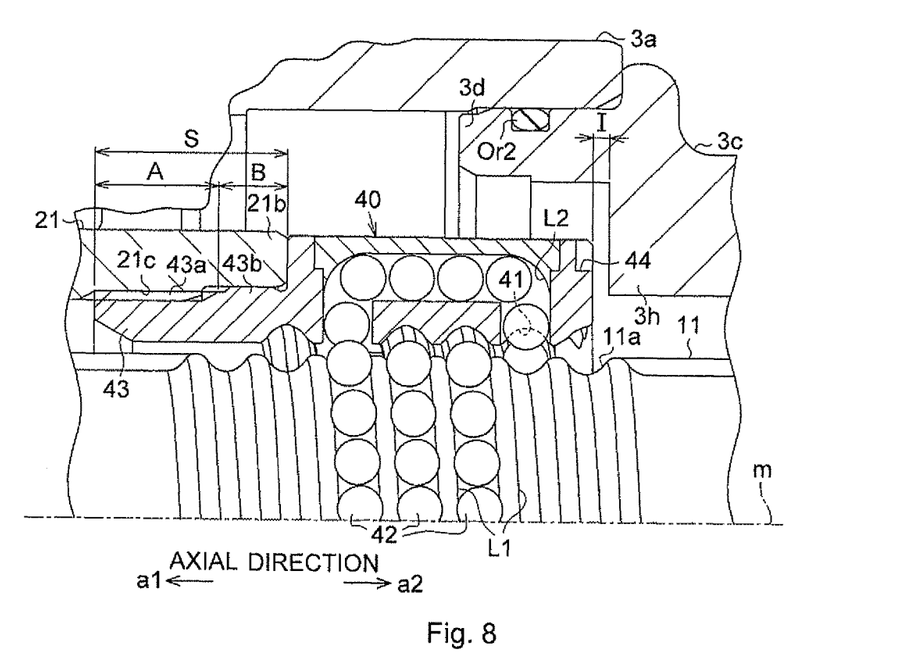
FIG. 8 is a sectional view that shows an enlarged sectional structure of the ball screw nut and its surrounding portions in an electric power steering system according to a fifth embodiment of the invention.

In the above-described embodiment, the axial movement of the ball screw nut 40 is restricted by restricting the axial movement of the bearing 51 by the third housing 3c. Alternatively, as shown in FIG. 8, in an electric power steering system that does not include the bearing 51, a step 3h may be formed in the inner periphery of the third housing 3c so as to face the end face of the ball screw nut 40 in the direction indicated by the arrow a2, and the axial movement of the ball screw nut 40 may be restricted by the step 3h (fifth embodiment). In this case, if the length S of the engaging portion 43 of the ball screw nut 40 is set longer than the width I of the clearance between the ball screw nut 40 and the step 3h of the third housing 3c, it is possible to maintain connection between the ball screw nut 40 and the motor shaft 21.

In the above-described embodiment, there is employed the structure in which the engaging portion 43 of the ball screw nut 40 is inserted into the motor shaft 21 and the external thread portion 43a of the ball screw nut 40 is screwed to the internal thread portion of the motor shaft 21 to fasten the ball screw nut 40 to the motor shaft 21. Alternatively, for example, the following structure may be employed. In this structure, an internal thread portion is formed in the inner periphery of the engaging portion 43 of the ball screw nut 40, and an external thread portion that is screwed to the internal thread portion is formed on the motor shaft 21. Then, the motor shaft 21 is inserted into the engaging portion 43 of the ball screw nut 40 and the external thread portion of the motor shaft 21 is screwed to the internal thread portion of the ball screw nut 40 to fasten the ball screw nut 40 to the motor shaft 21.

What is claimed is:

1. An electric power steering system that applies assist force that assists an operation of a steering system of a vehicle to a rack shaft by transmitting driving force of a motor to the rack shaft, the system comprising:
   a cylindrical motor shaft through which the rack shaft of the vehicle is passed, and that is rotated by driving of the motor;
   a motion conversion mechanism that has an engaging portion engaged with the motor shaft, and that converts a rotational motion of the motor shaft into an axial linear motion of the rack shaft:
   a bearing that is arranged on an outer periphery of the motion conversion mechanism; and
   a restricting member that restricts a distance, to a predetermined distance, that the motion conversion mechanism is able to move relative to the motor shaft, wherein
      the motion conversion mechanism moves in a same direction in which the engaging portion becomes disengaged;
      the bearing is provided so as to be movable together with the motion conversion mechanism in the same direction in which the engaging portion becomes disengaged;
      the restricting member is formed of a member that is arranged to face the bearing with a predetermined clearance left between the restricting member and the bearing; and
      a length of the engaging portion is set longer than the predetermined distance.

2. The electric power steering system according to claim 1, wherein:

the bearing is a rolling bearing that includes an inner ring through which the motion conversion mechanism is passed, and an outer ring that is arranged radially outward of the inner ring; and the restricting member is provided so as to contact only the outer ring when the rolling bearing moves in the same direction in which the engaging portion becomes disengaged.

3. The electric power steering system according to claim 1, wherein a step is formed on the outer periphery of the motion conversion mechanism, and the step contacts the bearing and pushes the bearing in the same direction in which the engaging portion becomes disengaged when the motion conversion mechanism moves relative to the motor shaft in the same direction in which the engaging portion becomes disengaged.

4. The electric power steering system according to claim 1, wherein:

the engaging portion has a thread portion that is screwed to a thread portion formed in the motor shaft, and a spigot engagement portion to which the motor shaft is fitted;

the motion conversion mechanism is coupled to the motor shaft through engagement between the thread portion of the engaging portion and the thread portion of the motor shaft; and the length of the engaging portion is set to a length that is a sum of a length of the thread portion of the engaging portion and a length of the spigot engagement portion.

5. The electric power steering system according to claim 1, wherein the restricting member is a housing that is provided so as to cover the rack shaft.

6. The electric power steering system according to claim 1, further comprising:

a motor shaft bearing that is fixed to the motor shaft, and that supports the motor shaft such that the motor shaft is rotatable;

a bearing restricting member that is fixed to a housing that covers an outer periphery of the motor shaft, and that restricts movement of the motor shaft bearing in the axial direction; and a rotation sensor that is arranged with a predetermined clearance left between the rotation sensor and the bearing restriction member in the axial direction, and that detects a rotation angle of the motor shaft, wherein a width of the clearance formed between the bearing restricting member and the rotation sensor is set longer than the predetermined distance.

* * * * *